Feb. 7, 1950  P. M. GRIFFIN  2,496,871
FLEXIBLE SHAFT COUPLING
Filed Sept. 7, 1944
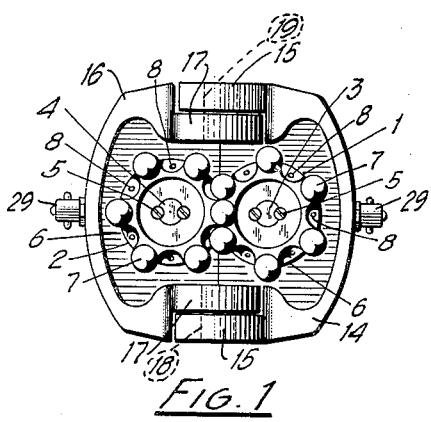
FIG.1
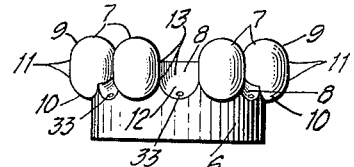
FIG.4
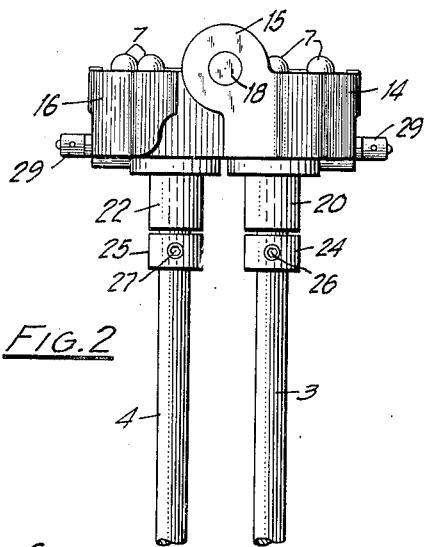
FIG.2
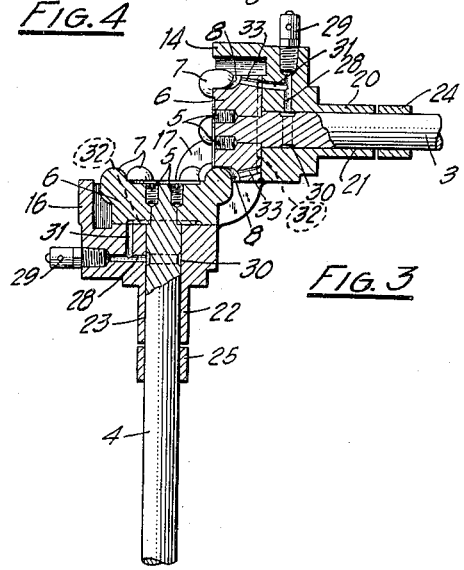
FIG.3
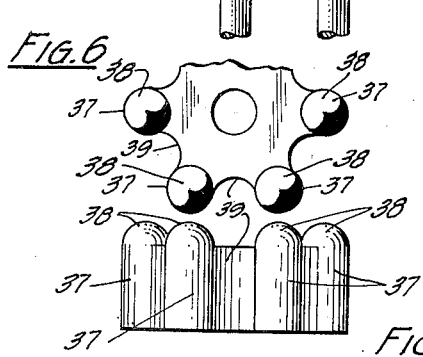
FIG.6
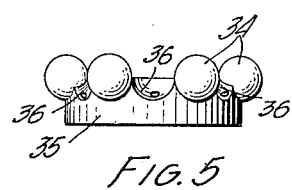
FIG.5
FIG.7
INVENTOR.
Percy M. Griffin
BY
ATTORNEY Patented Feb. 7, 1950

2,496,871

UNITED STATES PATENT OFFICE 2,496,871

FLEXIBLE SHAFT COUPLING

Percy M. Griffin, Albany, N. Y., assignor to Consolidated Car-Heating Company, Inc., Albany, N. Y., a corporation of New York Application September 7, 1944, Serial No. 553,085

6 Claims. (Cl. 74—380)

My invention relates to shaft couplings and particularly to couplings designed to connect together two shafts whose axes are coplanar but which may be disposed at any angle to each other between 0° and 180°. It relates to improvements in couplings of the general type disclosed in Erdman Patent No. 2,261,901.

Shaft couplings of the Erdman type comprise two meshed gear elements which permit two shafts whose axes are coplanar to be operatively connected together when these axes are disposed to each other at any angle between 0 and 90°. In many instances it is necessary to connect two shafts together whose axes intersect so that the interior angle formed thereby is less than 90°. In such a case, with the Erdman type of coupling, two separate couplings are required.

The principal object of my invention therefore, is to provide a coupling of the general type disclosed by Erdman but which is adapted to connect together two shafts whose axes are coplanar but which are disposed in any angular relationship to each other between a position in which the shafts are coaxial and a position in which the axes of the shafts are parallel to each other. A more specific object is to provide a pair of gears, of such design that either may be rotated 180° with respect to the other about an axis tangent to the pitch circles of said gears at their point of contact while maintaining said gears in operative meshing relation.

With these objects in view my invention includes the novel elements and the combinations and arrangements thereof described below and illustrated in the accompanying drawings in which—

Fig. 1 is a top plan view of my coupling as it appears when connecting two parallel shafts together;

Fig. 2 is a front elevation view of the coupling in the position shown in Fig. 1 and showing fragmentary portions of the connected shafts;

Fig. 3 is a section of the coupling taken in the plane of the shaft axes and showing the relation of the parts when these axes are disposed at an angle of 90° to each other;

Fig. 4 is a side elevation view of the preferred form of gear element;

Fig. 5 is a view similar to Fig. 4 but illustrating a modified type of gear element;

Fig. 6 is a fragmentary plan view of another modified type of gear element; and

Fig. 7 is an elevation view thereof.

Referring to Figs. 1, 2, 3 and 4 of the drawings, my coupling comprises two preferably, but not necessarily, identical gear elements 1 and 2 which are connected to the shafts 3 and 4, respectively, by means of screws 5. These gears, as illustrated, are formed from cylindrical, disk-like bodies 6 having a plurality of projections 7 comprising spherical surfaces with their centers substantially on and equi-circumferentially spaced about the circle defining the intersection of the cylindrical surface of said body and the plane of one of the sides or ends thereof or a plane parallel to the end or side plane and slightly spaced outwardly therefrom, if desired, and recesses 8 in the body between said projections adapted to receive and cooperate with the projections on another identical gear. I prefer to have both projections and recesses on each gear so that the gears are identical, but it is to be understood that all of the projections may be on one gear and all of the recesses on the other gear.

In the preferred form of gear element shown in Figs. 3 and 4, the tops 9 and the bottoms 10 of the projections forming the gear teeth are spherical surfaces having their centers spaced from each other and which are connected by an intermediate cylindrical portion having the same diameter as the spherical portions. In this case the bottoms 12 of the recesses are also spherical surfaces having their centers substantially in the same plane and the same circle as the centers of the spherical surfaces constituting the bottoms 10 of the tooth forming projections 7. These spherical surfaces merge into cylindrical surfaces 13 which extend upwardly to and intersect the top surface of the body. It is to be understood, of course, that the diameter of the spherical and cylindrical surfaces constituting the surfaces of the recesses 8 are slightly larger than the diameter of the projections in order to provide necessary working clearances.

From the foregoing it will be apparent that the circle defining the intersection of the cylindrical surface of the disk-like body and the plane of one side or end thereof on which the centers of the projections 7 are located lies on the pitch cylinder of the gear.

The gear 1 is provided with a housing 14 having ears 15 thereon, and the gear 2 is provided with a housing 16 having the ears 17 thereon. These housings are pivotally connected together by coaxial pins 18 and 19 and the common axis of these pins is tangent to the pitch circles of the gear elements. The housing 14 is provided with a projection 20 having a passage 21 therethrough forming a bearing for the shaft 3, and the housing 16 is provided with a projection 22 having a passage 23 therethrough forming a bearing for the shaft 4. Collars 24 and 25 are secured by set screws 26 and 27, respectively, to the shafts 3 and 4 to hold the gears in proper mesh.

In order to lubricate the shafts and gears each housing is provided with a radially extending passage 28 into the outer end of which is threaded an "Alemite" fitting 29. The passages 28 communicate with grooves 30 in the shafts 3 and 4 into which grease may be forced to lubricate the shaft bearings. Each housing is provided with a transverse passage 31 which provides communication between the passage 28 therein and the space between the back of the gear and the housing. The gears are preferably provided with an annular, grease-distributing recess on the back, as shown in dotted outline at 32, and the gears are provided with passages 33 which communicate with this recess and the bottom of each of the tooth-receiving recesses in the gear elements. Thus, grease forced into the passage 28 will flow through passages 31 into the recesses in the backs of the gears and thus through the passages 33 into the recesses between the projections 7.

In Fig. 5 I have shown a slight modification of the gear element in which the projections 34 of the disk-like body 35 are spherical throughout instead of being partially spherical and partially cylindrical as in the type shown in Figs. 3 and 4. Likewise the depressions 36 between the projections are spherical throughout.

In Figs. 6 and 7 I have shown a further modification in which the tooth-forming elements 37 comprise cylindrical surfaces capped at the top by hemispherical surfaces 38, and the spaces 39 between the tooth elements are cylindrical surfaces tangent to the cylindrical surfaces of the teeth. The cylindrical surfaces of the teeth and the spaces therebetween extend from top to bottom (or from side to side) of the gear blank or disk, and the hemispherical surfaces have their centers in and project above the top surface of the disk. This type of gear is not as desirable as those shown in Figs. 3, 4 and 5 because of the difficulty in holding a lubricant in the spaces between the teeth.

From the foregoing it will be apparent that the housings are rotatable with respect to each other about the common axis of the pins 18 and 19 from the position shown in Fig. 2 through the position shown in Fig. 3 to a position (not shown) in which the shafts 3 and 4 will be coaxial and, at all times, the gear elements will be in mesh with each other. It will also be apparent that the teeth must project both laterally and axially beyond the bodies of the gears, and that the tooth-receiving recesses in the gears must open into the lateral peripheral surfaces of the gear bodies, otherwise, the gears could not be positioned as shown in Fig. 2.

While I have described my invention in its preferred embodiment it is to be understood that the words which I have used are words of description rather than of limitation and that changes within the purview of the appended claims may be made without departing from the true scope and spirit of my invention.

What I claim is:

1. In a flexible shaft coupling a pair of meshed gears, one of said gears having tooth forming projections about the periphery thereof, and the other of said gears having recesses about the periphery thereof meshing with said projections on the first mentioned gear when the axes of said gears are in side-by-side, parallel disposed relation; said tooth forming projections extending axially beyond one side of said first mentioned gear and terminating in hemispherical surfaces meshing with the recesses in said other gear when said gears are coaxial.

2. A flexible shaft coupling comprising a pair of gear housings, a bearing in each housing, means pivotally connecting said housings together and providing relative movement thereof between a position in which said bearings are in aligned, substantially, coaxial relation and a position in which the axes of said bearings are in side-by-side, approximately parallel-disposed relation, a pair of gears each comprising a generally cylindrical disk-like body, and means rotatably mounting said gears in said bearings in meshed relation; at least one of said gears being provided with a plurality of equi-circumferentially spaced, tooth-receiving recesses extending axially, and radially inwardly from the lateral peripheral surface of the body thereof and opening into one end of said body, and the other of said gears being provided with a plurality of equi-circumferentially spaced, tooth-forming projections extending axially beyond one end of the body of said other gear and also radially beyond the lateral peripheral surface thereof; those portions of said projections extending beyond the end of said body having spherical surfaces with their centers on a circle tangent to the axis of said pivotal connecting means, and the surfaces of those portions extending beyond the peripheral surface of said body being substantially complementary in shape to the surfaces defining those portions of said tooth-receiving recesses extending radially inwardly.

3. A flexible shaft coupling comprising a pair of gear housings, a bearing in each housing, means pivotally connecting said housings together and providing relative movement thereof between a position in which said bearings are in aligned, substantially, coaxial relation and a position in which the axes of said bearings are in side-by-side, approximately parallel-disposed relation, a first gear, and means rotatably mounting said gear in one of said bearings, a second gear in mesh with said first gear and means rotatably mounting said second gear in the other of said bearings; each of said gears comprising a generally cylindrical, disk-like body having a plurality of equi-circumferentially spaced teeth thereon and provided with tooth-receiving recesses between said teeth; said teeth comprising spherical surfaces projecting both axially and radially beyond said body; and said recesses extending axially and also radially inwardly from the periphery of the gear body to receive those portions of the teeth on the other gear which project radially therefrom when the axes of said bearings are in side-by-side, parallel disposed relation, and opening into the end of said body from which said teeth axially project to receive the axially projecting portions of the teeth on the other gear when the axes of said bearings are in aligned relation; the centers of the spherical surfaces of said teeth on each of said gears lying in a circle substantially tangent to the axis of said bearings.

4. The structure set forth in claim 3 in which said gears are substantially identical in size and shape.

5. In a flexible shaft coupling, a gear element comprising a generally cylindrical, disk-like body having a plurality of equi-circumferentially spaced, tooth-forming projections thereon extending both axially and radially beyond said body, and a plurality of tooth-receiving recesses in the peripheral surface of said body extending axially thereof and opening in that end of the body beyond which said projections axially extend and between said projections; those portions of said tooth-forming projections which extend axially beyond said body having spherical surfaces with their centers lying substantially in the surface of the cylinder defining the peripheral surface of said body; and the surfaces of said recesses being surfaces of revolution having their axes on the surface of said cylinder; said recesses being of a size and shape to mesh with those portions of the tooth-forming projections on an identical gear element which extend axially beyond the body of said identical gear element when said gears are in axial alignment, and to mesh with those portions of said projections on said identical gear element which extend radially beyond the body thereof when the axes of said gears are in side-by-side, parallel disposed relation.

6. In a flexible shaft coupling, a pair of meshed gears comprising generally cylindrical, disk-like bodies; at least one of said bodies being provided with a plurality of axially extending, tooth-forming projections about the periphery thereof comprising approximately semi-cylindrical surfaces merging into hemispherical surfaces beyond one end of said body, and the other of said bodies being provided with a plurality of axially extending, approximately semi-cylindrical recesses about the periphery thereof open at one end; the diameter of said recesses being slightly greater than the diameter of said projections adapting them to receive and cooperate with the projections on the first mentioned body.

PERCY M. GRIFFIN.

REFERENCES CITED

The following references are of record in the file of this patent:

UNITED STATES PATENTS

| Number | Name | Date |
|---|---|---|
| 526,359 | Ashberry et al. | Sept. 18, 1894 |
| 620,074 | Jamieson | Feb. 21, 1899 |
| 1,791,047 | Symons | Feb. 3, 1931 |
| 2,324,061 | Brooks | July 13, 1943 |
| 2,330,552 | Brooks | Sept. 28, 1943 |
| 2,342,625 | Brooks | Feb. 29, 1944 |
| 2,359,654 | Ligh | Oct. 3, 1944 |